United States Patent
Kim et al.

(10) Patent No.: US 10,708,915 B2
(45) Date of Patent: Jul. 7, 2020

(54) CONTROL CHANNEL IN WLAN OFDMA

(71) Applicant: Apple Inc., Cupertino, CA (US)

(72) Inventors: Joonsuk Kim, Saratoga, CA (US); Guoqing Li, Cupertino, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 15/147,365

(22) Filed: May 5, 2016

(65) Prior Publication Data
US 2016/0330741 A1 Nov. 10, 2016

Related U.S. Application Data

(60) Provisional application No. 62/157,339, filed on May 5, 2015.

(51) Int. Cl.
| | | |
|---|---|---|
| *H04W 72/04* | (2009.01) | |
| *H04L 5/00* | (2006.01) | |
| *H04W 52/14* | (2009.01) | |
| *H04W 84/12* | (2009.01) | |

(52) U.S. Cl.
CPC ....... *H04W 72/0453* (2013.01); *H04L 5/0053* (2013.01); *H04W 52/143* (2013.01); *H04W 72/042* (2013.01); *H04W 72/0413* (2013.01); *H04L 5/0007* (2013.01); *H04W 84/12* (2013.01)

(58) Field of Classification Search
CPC ............ H04W 72/0453; H04W 52/143; H04L 5/0053
See application file for complete search history.

(56) References Cited

U.S. PATENT DOCUMENTS

| | | | |
|---|---|---|---|
| 2008/0232490 A1* | 9/2008 | Gross | H04L 5/0037 375/260 |
| 2009/0303969 A1 | 12/2009 | Lee et al. | |
| 2010/0167768 A1* | 7/2010 | Tsutsui | H04B 7/15542 455/500 |
| 2012/0300718 A1 | 11/2012 | Ji et al. | |
| 2013/0039297 A1* | 2/2013 | Wang | H04W 76/25 370/329 |
| 2013/0242880 A1* | 9/2013 | Miao | H04L 5/001 370/329 |

(Continued)

FOREIGN PATENT DOCUMENTS

| | | |
|---|---|---|
| CN | 101322430 A | 12/2008 |
| CN | 101764644 A | 6/2010 |

(Continued)

*Primary Examiner* — Siming Liu
(74) *Attorney, Agent, or Firm* — Sterne, Kessler, Goldstein & Fox P.L.L.C.

(57) ABSTRACT

Systems and methods of providing control information to wireless devices accessing a wireless network are provided. According to some embodiments, a method of wireless communication is provided. According to the method, a first wireless communication channel is assigned to a first wireless device. A second wireless communication channel is assigned to a second wireless device. A third wireless communication channel is designated for use as a control channel that is common to the first and second wireless devices and control information is transmitted to the first and second wireless devices via the third wireless communication channel.

19 Claims, 12 Drawing Sheets

(56) References Cited

U.S. PATENT DOCUMENTS

| | | | |
|---|---|---|---|
| 2013/0315109 A1* | 11/2013 | Raaf | H04B 7/15528 370/277 |
| 2014/0031031 A1* | 1/2014 | Gauvreau | H04L 5/0053 455/426.1 |
| 2015/0063241 A1* | 3/2015 | Shimezawa | H04W 72/042 370/329 |
| 2015/0245322 A1* | 8/2015 | Shimezawa | H04L 5/0053 370/329 |
| 2016/0142898 A1* | 5/2016 | Poitau | H04W 76/14 370/329 |
| 2016/0337916 A1* | 11/2016 | Deenoo | H04W 8/22 |

FOREIGN PATENT DOCUMENTS

| | | | |
|---|---|---|---|
| CN | 104186018 A | 12/2014 | |
| EP | 1981306 A2 | 10/2008 | |
| WO | WO-2016154350 A1 * | 9/2016 | H04L 5/0055 |

* cited by examiner

CONTROL CHANNEL IN WLAN OFDMA

CROSS-REFERENCE TO RELATED APPLICATIONS AND INCORPORATION BY REFERENCE

The present application claims priority to U.S. Provisional Patent Application No. 62/157,339, titled "Control Channel in WLAN OFDMA," which was filed on May 5, 2015, and is herein incorporated by reference in its entirety.

BACKGROUND

In wireless communication schemes (e.g., 802.11 and the like) there has recently been a demand to provide more control information to wireless devices accessing a wireless access point. This demand is particularly prevalent in communications schemes such as, for example, Orthogonal Frequency-Division Multiple Access (OFDMA) modulation schemes. OFDMA is a digital modulation scheme that assigns subsets of subcarriers to its devices. OFDMA is employed in a variety of wireless standards, including several IEEE 802.x standards.

BRIEF SUMMARY

Systems and methods of providing control information to wireless devices accessing a wireless network are provided. According to some embodiments, a method of wireless communication is provided. According to the method, a first wireless communication channel is assigned to a first wireless device. A second wireless communication channel is assigned to a second wireless device. A third wireless communication channel is designated for use as a control channel that is common to the first and second wireless devices, and control information is transmitted to either or both of the first and second wireless devices via the third wireless communication channel.

Embodiments may also include communication channels that include subcarriers of an orthogonal frequency-division multiple access (OFDMA) modulation scheme. Furthermore, the third wireless communication channel can be centered on a center frequency (e.g., at or near the DC tone) of the OFDMA modulation scheme. The control information can be used by either or both of the wireless devices as a way to prepare them to receive subsequent data packets on their respective assigned data channels. For instance, the control information may include one or more of: a transmission power, a center frequency offset, timing information for trigger frames and the like, and resource unit assignment information. Additionally, the control channel may be used to send control information to specific wireless devices. For instance, first control information could be transmitted via the control channel to the first wireless device and second control information could be transmitted via the control channel to the second wireless device.

According to some embodiments, a wireless access point is provided. The wireless access point may include a wireless interface configured to communicate with a plurality of wireless channels and one or more processors communicatively coupled to the wireless interface and configured to facilitate communication with a plurality of wireless devices. The one or more processors may be further configured to assign each of the plurality of wireless devices to a corresponding plurality of wireless communication channels. Additionally, the one or more processors can be configured to transmit control information intended for at least a subset of the plurality of wireless devices via a common control channel. This common control channel may be separate from the plurality of wireless communication channels and may, for instance, include a subcarrier centered on a center frequency (e.g., at or near the DC tone) of the OFDMA modulation scheme.

Some embodiments of the disclosure relate to a wireless device configured to communicate with a wireless access point via one or more wireless communication channels. The wireless device may include a wireless interface configured to communicate with the one or more wireless communication channels and one or more processors coupled to the wireless interface. The one or more processors may be configured to receive data packets from the wireless access point via one of the wireless communication channels. Additionally, the one or more processors may be configured to receive control information from the wireless access point via a separate control channel that is common to (e.g., also can be used by) at least one additional wireless device.

BRIEF DESCRIPTION OF THE DRAWINGS/FIGURES

Embodiments of the present disclosure will now be described, by way of example only, with reference to the accompanying schematic drawings in which corresponding reference symbols indicate corresponding parts. Further, the accompanying drawings, which are incorporated herein, form part of the specification and illustrate embodiments of the present disclosure.

Figure 1:
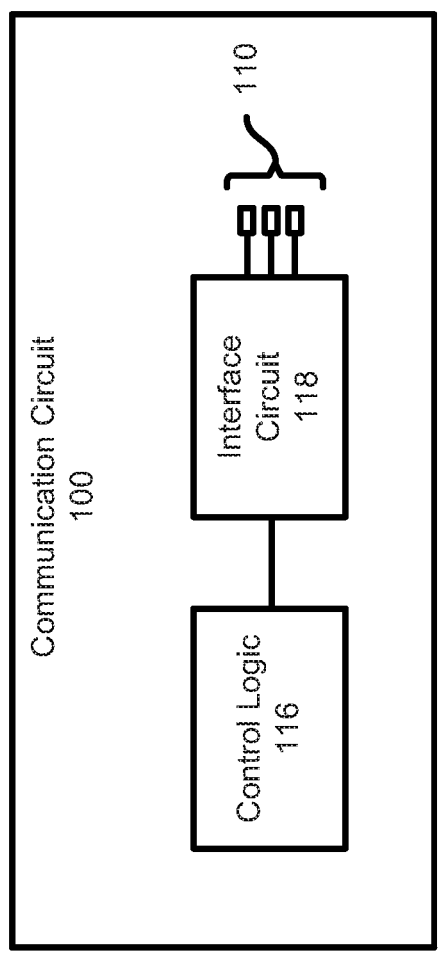
FIG. 1 is a functional block diagram depicting an example communication circuit, according to some embodiments.

The features and advantages of embodiments of the present disclosure will become more apparent from the detailed description set forth below when taken in conjunction with the drawings. In the drawings, like reference numbers generally indicate identical, functionally similar, and/or structurally similar elements.

DETAILED DESCRIPTION

This specification discloses one or more embodiments that incorporate the features of this disclosure. The disclosed embodiment(s) merely exemplify the present disclosure. The scope of the present disclosure is not limited to the disclosed embodiment(s). The present disclosure is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments, whether or not explicitly described in the specification.

The described embodiments relate to techniques for communicating information among electronic devices, including techniques for specifying a control channel for use in a wireless local area network (WLAN) that communicates information using Orthogonal-Frequency Division Multiple Access (OFDMA).

These communication techniques may be used during wireless communication between electronic devices in accordance with a communication protocol, such as: an Institute of Electrical and Electronics Engineers (IEEE) 802.11 standard (which is sometimes referred to as "Wi-Fi"). For example, the communication techniques may be used with IEEE 802.11 ax. However, the communication techniques may also be used with a wide variety of other communication protocols.

FIG. 1 illustrates an example communication circuit 100 according to some embodiments. Communication circuit 100 may be implemented as an integrated circuit and may be used to implement some or all of the functionality of a networking system, such as subsystem 914 (discussed below). This is illustrated in FIG. 1, which presents a block diagram of communication circuit 100 in accordance with some embodiments. In particular, communication circuit 100 may include: control logic 116, an interface circuit 118, and a set of nodes 110 (such as pads) that can couple to set of antennas 920 (see FIG. 9, discussed below). The communication circuit, in some embodiments, is configured to communicate with multiple channels including a control channel that is common to multiple communications circuits, as described below.

In some embodiments, an output of a process for designing the integrated circuit, or a portion of the integrated circuit, which includes one or more of the circuits described herein may be a computer-readable medium such as, for example, a solid-state memory device, or an optical or magnetic disk. The computer-readable medium may be encoded with data structures or other information describing circuitry that may be physically instantiated as the integrated circuit or the portion of the integrated circuit. Although various formats may be used for such encoding, these data structures can be written in a format such as: Caltech Intermediate Format (CIF), Calma GDS II Stream Format (GDSII) or Electronic Design Interchange Format (EDIF). Those of skill in the art in integrated circuit design can develop such data structures from schematic diagrams of the type detailed above and the corresponding descriptions and encode the data structures on the computer-readable medium. Those of skill in the art in integrated circuit fabrication can use such encoded data to fabricate integrated circuits that include one or more of the circuits described herein.

Figure 2:
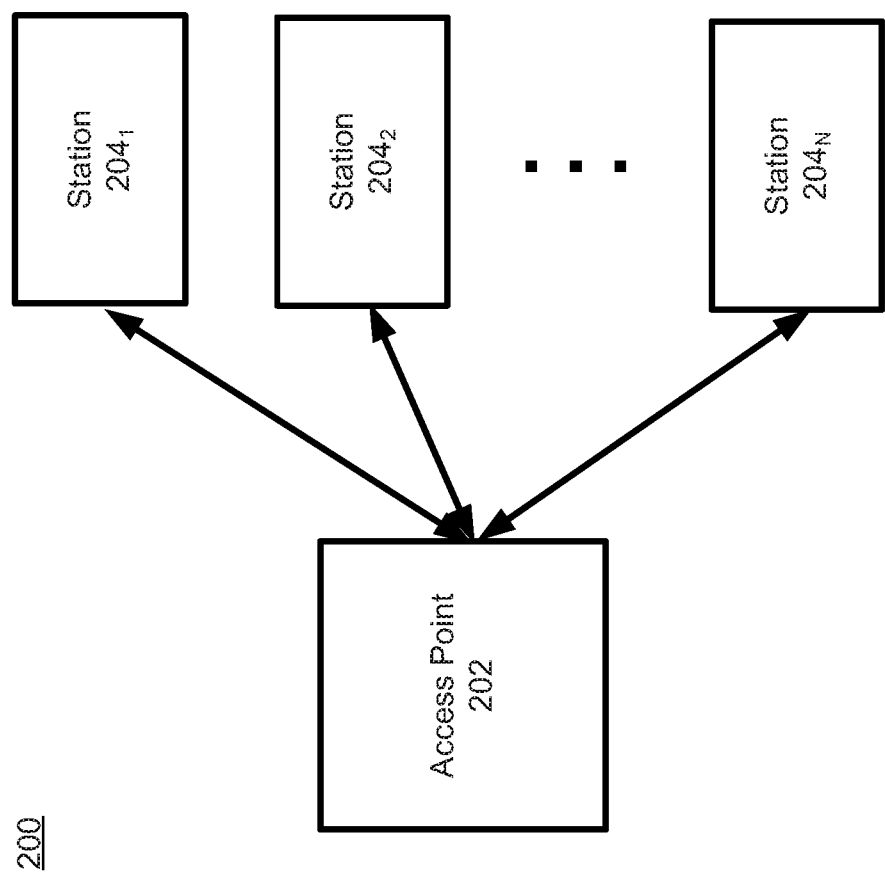
FIG. 2 is a functional block diagram depicting an example wireless communication network, according to some embodiments.
Figure 9:
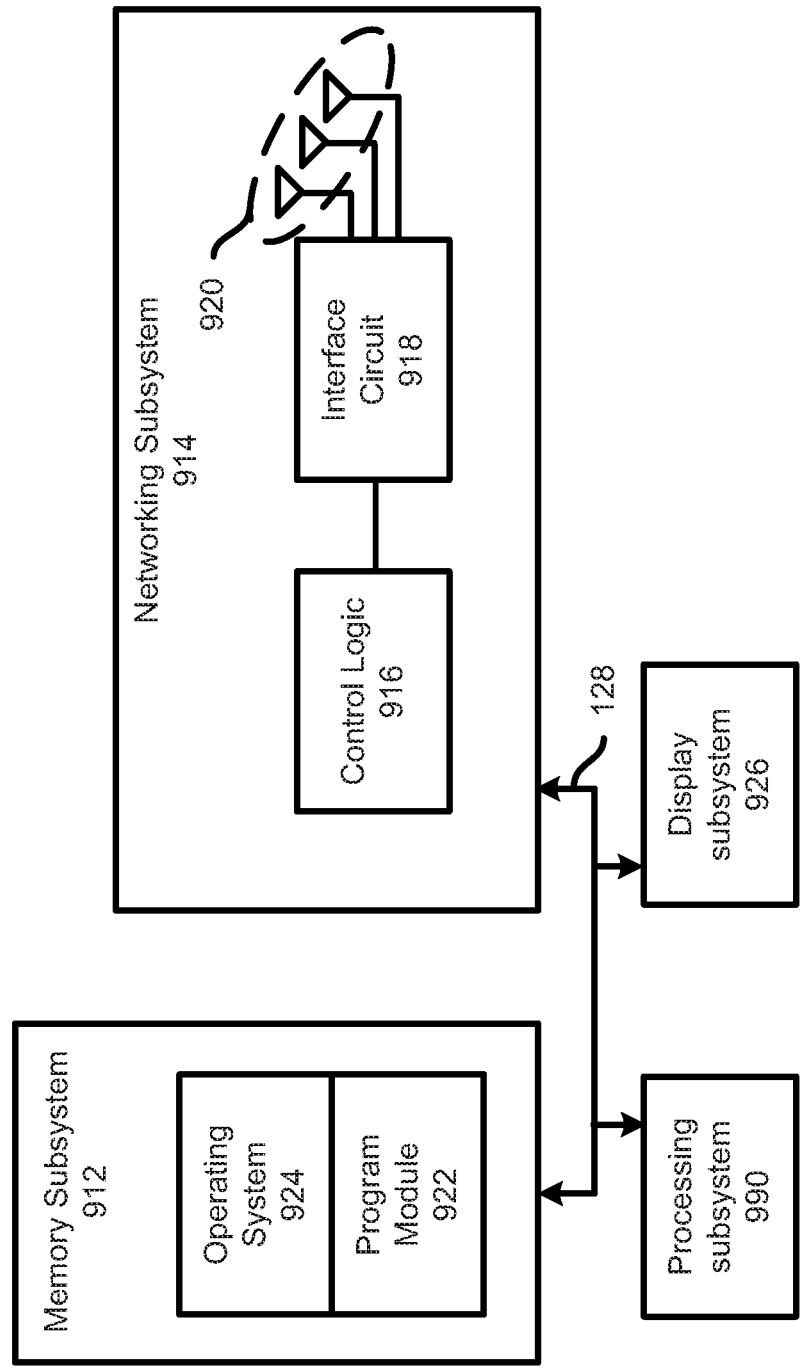
FIG. 9 is a functional block diagram depicting an example electronic device, according to some embodiments.

FIG. 2 is a functional block diagram depicting an example wireless network 200 according to some embodiments. The wireless network contains an access point 202 and a plurality of stations $204_1$, $204_2$, . . . $204_N$ (collectively "stations 204"). According to some embodiments, the access point 202 could be implemented using electronic device 900 as shown in FIG. 9. Stations 204 may represent any device configured to communicate via a wireless network such as smart phones, tablet computers, laptop computers, personal computers, wearable computers, and the like. Because the various stations 204 may have different needs and different physical locations (e.g., distance from the access point 202), they may have different link budgets to the access point. Additionally, packets from each of the stations 204 may arrive at the access point 202 at different received powers ("RX powers"), which can cause automatic gain control settling issues at the access point. Information on a transmission power between access point 202 and each of the stations 204 can assist with a goal of having stations 204 receive packets at similar RX power levels. This goal can be accomplished by periodically sending control information to the stations 204. To facilitate this, particular tone mappings can be used. In some embodiments, the stations 204 are each configured to communicate with the access point via multiple channels. For instance, each station 204 may have a dedicated channel with the access point 202 in addition to a control channel that is common (i.e., shared by) some or all of the other stations 204. The control channel may, in some embodiments, be used to transmit control information such as UL power control per electronic device or station (STA), uplink carrier frequency offset (CFO), or sampling time offset (STO), information for UL Multi-user (UL-MU) packets, UL RU-assignment information for multi-user acknowledgement, and/or timing information for a triggering frame, or any other kind of control information.

Figure 3A:
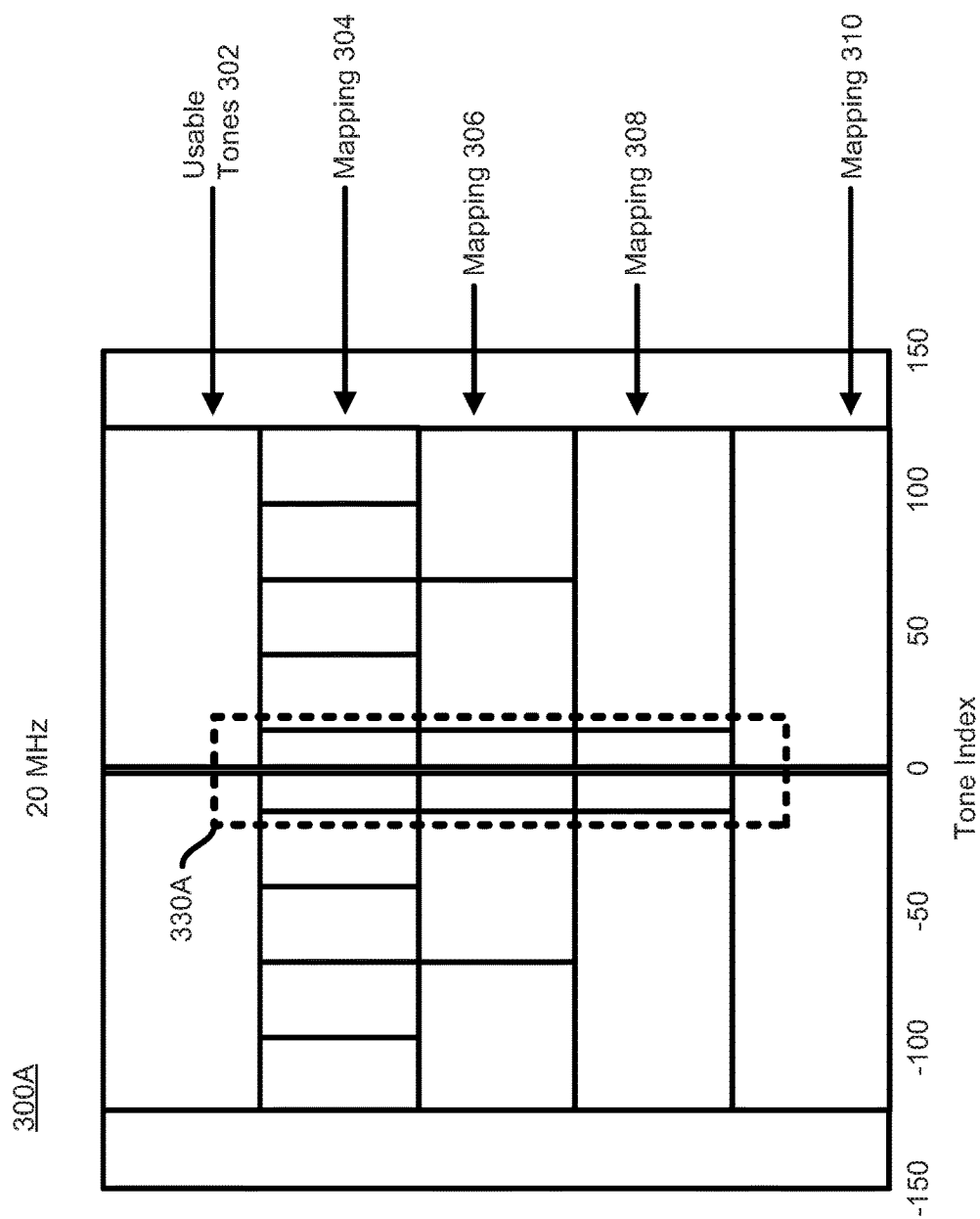
FIGS. 3A-3C are block diagrams of possible tone mappings for an example wireless communication network, according to some embodiments.
Figure 3B:
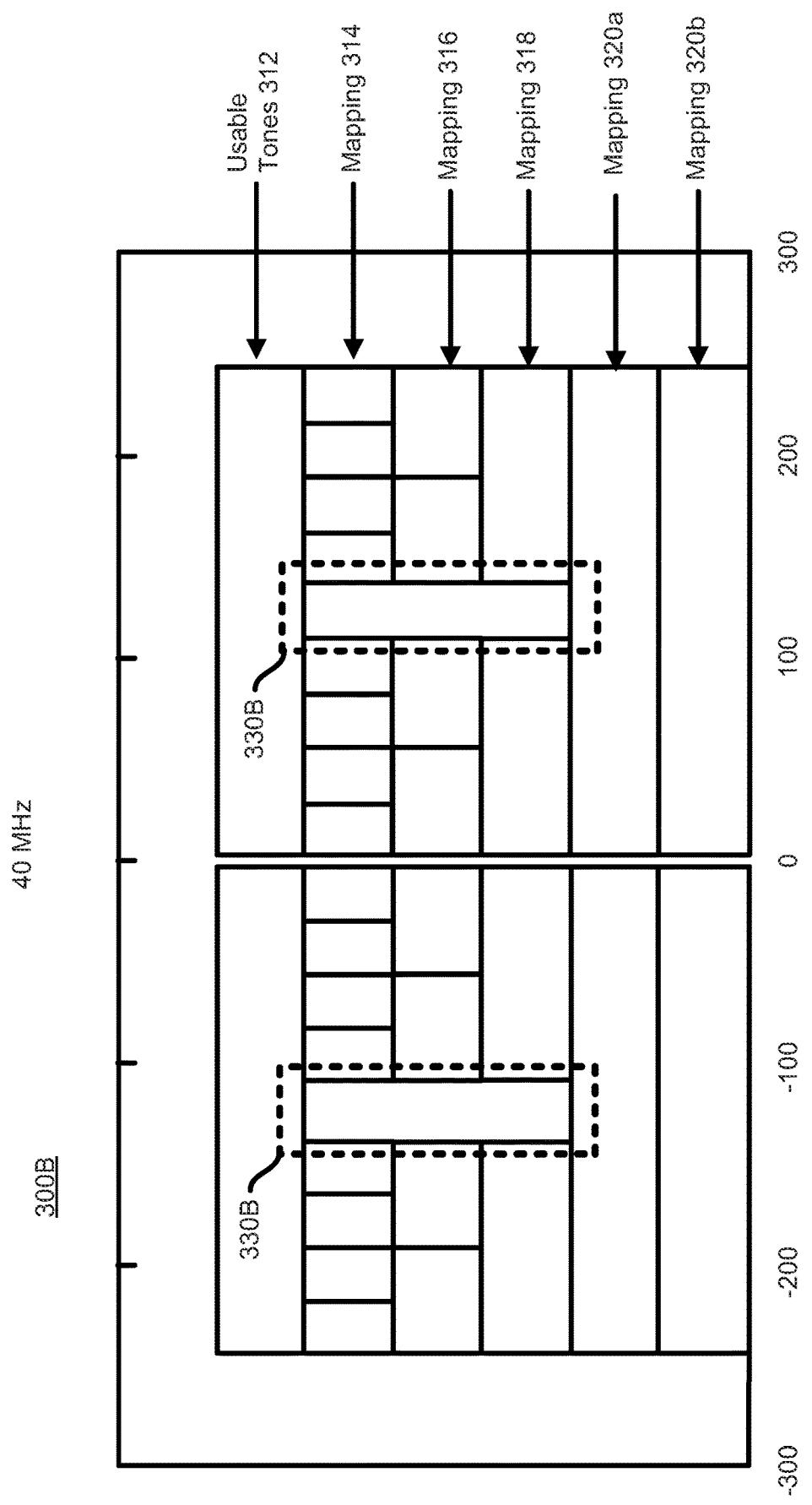
Figure 3C:
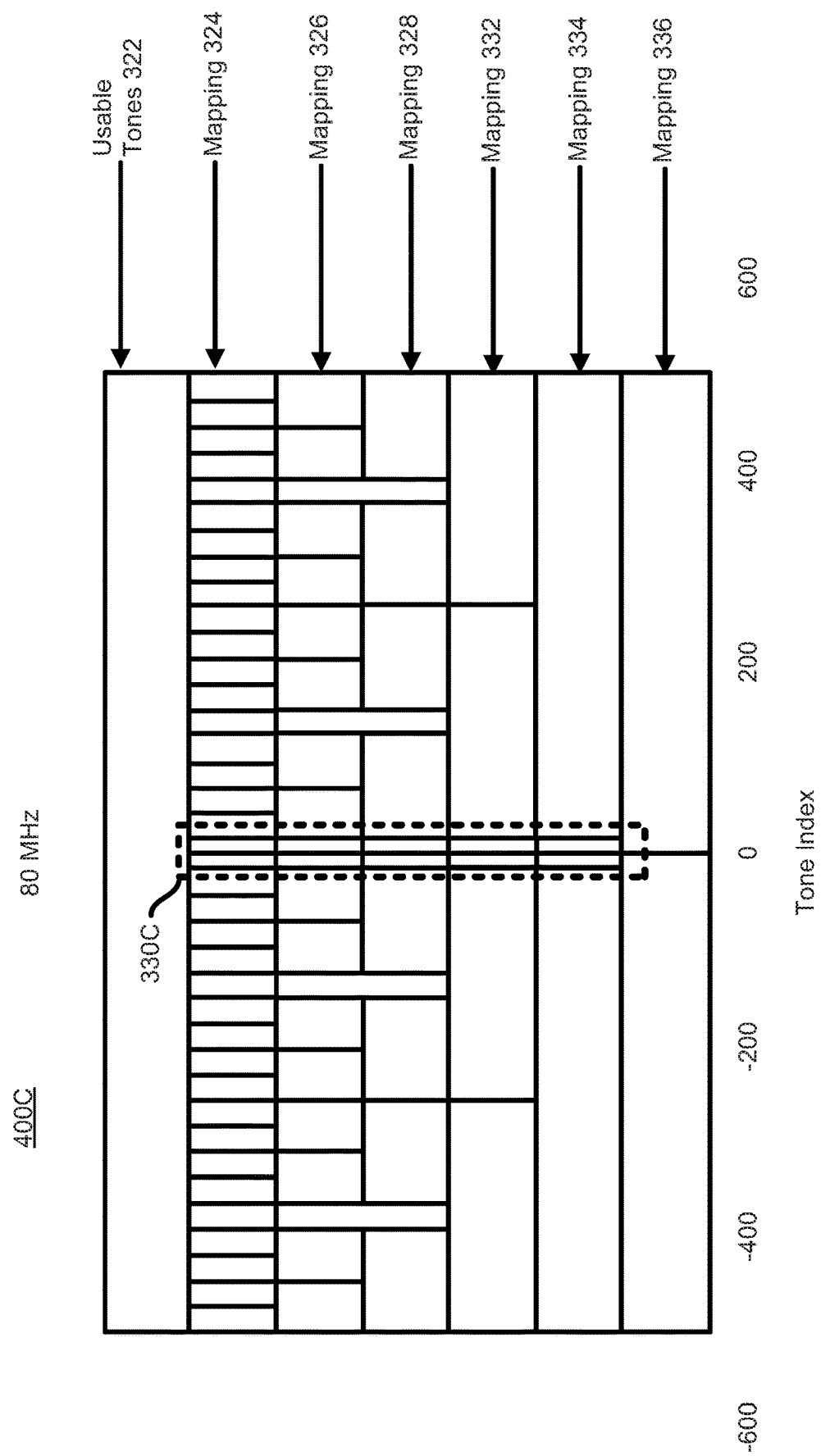

FIGS. 3A-3C depict different OFDMA tone mappings that may be used, depending on bandwidth, according to some embodiments. For instance, FIG. 3A depicts a possible tone mapping 300A that can be used for a 20 MHz band according to some embodiments. FIG. 3B depicts a possible tone mapping 300B that can be used for a 40 MHz bandwidth according to some embodiments. And FIG. 3C depicts a possible tone mapping 300C that can be used for an 80 MHz band according to various embodiments.

FIG. 3A shows a number of possible ways that usable tones 302 may be mapped for a 20 MHz band. As shown in FIG. 3A, with mapping 304, there may be up to 9 user devices in each 20 MHz band when channels of 26 tone resource units (RU) are employed. For example, one user device may be assigned 242 data tones (out of 256 available tones, with the remainder being DC tones, pilot tones and guard tones) in a resource block or unit when OFDMA is not used (mapping 310). Alternatively, when OFDMA is used, there may be other assignments, e.g., two user devices may be assigned a to-be-determined (TBD) number of tones in two resource blocks and one user device may be assigned 26 data tones in another resource block; four user devices may be assigned 52 data tones (mapping 306) in four resource blocks and one user device may be assigned 26 data tones in another resource block; or nine user devices may be assigned 26 data tones in nine resource blocks (mapping 304). As shown in FIG. 4A, the mappings 304-308 include between 2 and 8 channels that can be assigned for use by a wireless device (e.g., station 204) depending on the number of RUs used. In each of those OFDMA cases, the center channel (e.g., channel 330A) can remain unassigned to a particular wireless device and can, instead, be used commonly by all of the devices to communicate control information, according to some embodiments.

FIG. 3B depicts a number of possible ways that usable tones 312 can be mapped if a 40 MHz bandwidth is used. As shown in FIG. 3B, mapping 300B includes mapping 314 when 26 tone RUs are used, dividing the usable tones 312 into 16 different channels for data and two common control channels 430B for use as control channels. Similar to FIG. 3A, FIG. 3B shows mapping 316 for 52 and 26 tone RUs, mapping 318 for 906 tones and 26 tone RUs, and mapping 320a for two 242 tone RUs and mapping 420b for two 242 tone RUs or 484 non-OFDMA applications. As shown in FIG. 3B, common control channels 330B can be shared by devices assigned to any of the channels in mappings 314, 316, and 318, according to some embodiments.

FIG. 3C is similar to FIGS. 3A and 3B and depicts a number of possible ways that usable tones 322 may be mapped for an 80 MHz bandwidth. For instance, mapping 324 shows the number of channels available when 26 tone RUs are employed. Mapping 326 shows the number of channels available when 52 and 26 tone RUs are used. Mapping 328 shows the number of channels available when 906, 52, and 26 tone RUs are employed. Mapping 332 shows the number of channels available when 242 tone RUs and a 26 tone RU are employed. Mapping 334 shows the number of channels available when two 242 tone RUs and a 26 tone RU are employed. Finally, mapping 336 depicts the non-OFDMA application employing 996 tone RUs. Similarly to FIGS. 3A and 3B, FIG. 3C shows that a common channel 330C can be used by any of the applications from mapping 424 to 434, according to some embodiments. Thus, with an 80 MHz bandwidth, up to 37 subchannels may be assigned to different user devices.

In some embodiments (e.g., FIGS. 3A-3C), with OFDMA operation, there are 26 center tones or resource units (RUs). In general, these center (or near DC) tones have poorer performance than a remainder of the bandwidth. However, with a lower modulation coding scheme (MCS), such as MCS0, the 26 center tones can be used to carry some control signals for other packets, e.g., for uplink (UL) packets in OFDMA.

Regardless of the assignment of RUs to different user devices, each of stations 304 or electronic devices that receive an OFDMA packet (i.e., the down link) may decode the control channel (in addition to their assigned tones or RUs). This control channel may be used for a variety of purposes, including: UL power control per electronic device or station (STA); uplink carrier frequency offset (CFO); or sampling time offset (STO); information for UL Multi-user (UL-MU) packets; UL RU-assignment information for multi-user acknowledgement, and/or timing information for a triggering frame. In some embodiments, the control channel can include information that facilitates preparation for subsequent packets (as opposed to the current packet).

Figure 4:
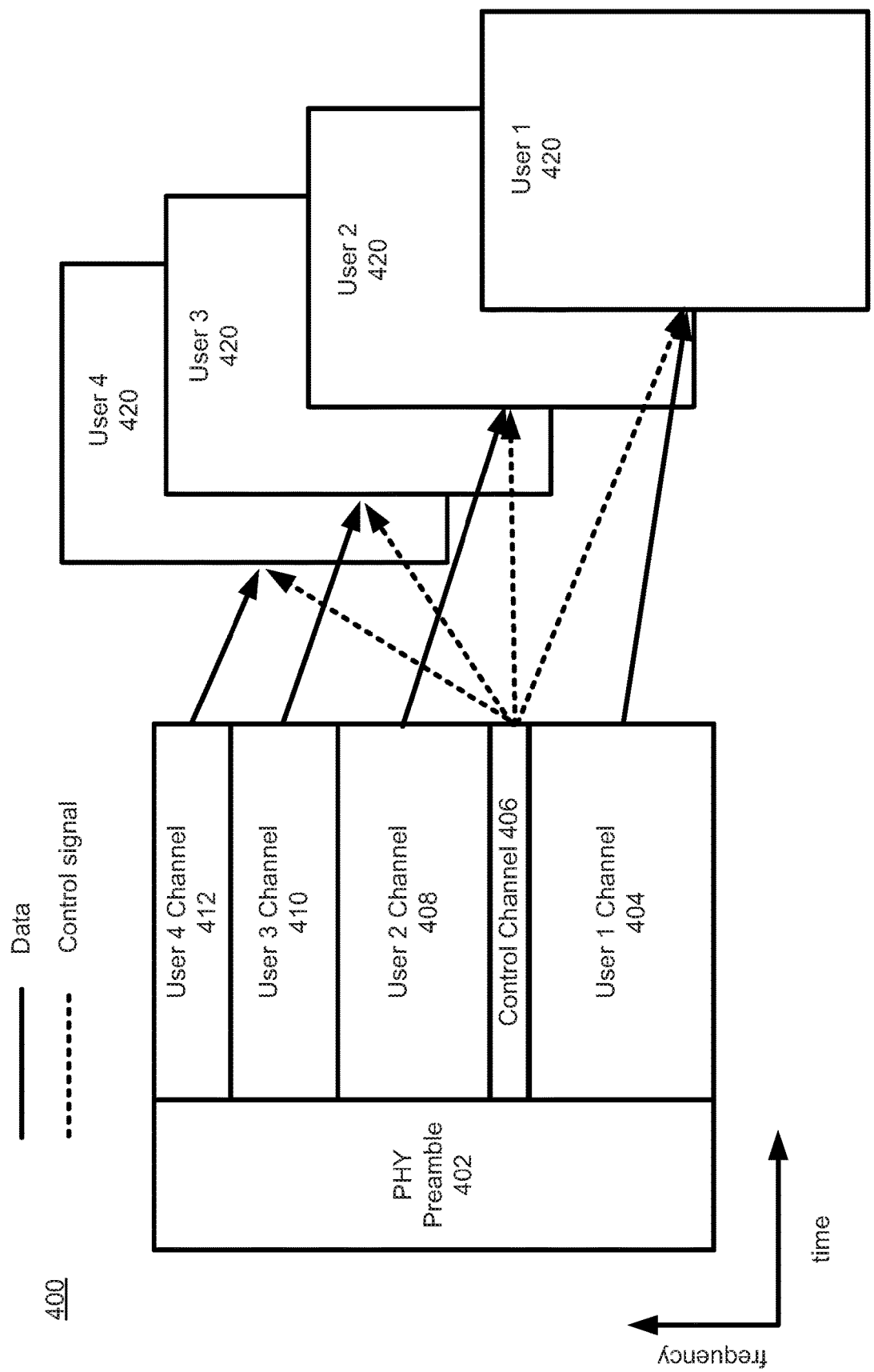
FIG. 4 depicts a communication scheme using an example common control channel, according to some embodiments.

FIG. 4 depicts an example scheme for transmitting data and control signals to various devices (e.g., stations 204) of an electronic network (e.g., network 200), according to some embodiments. As shown, data sent to the various devices 420 may include a physical layer (PHY) preamble 402 received by each of devices 420. The devices may then receive data (see solid lines) from their corresponding channels. For instance, user 1 receives data from user 1 channel 404, user 2 receives data from user 2 channel 408, user 3 receives data via user 3 channel 410, and user 4 receives data via user 4 channel 412. Common control channel 406 can simultaneously transmit to each of the devices (see dotted line), according to some embodiments. As noted above, this control channel 406 may transmit data relating to UL power control per electronic device or station (STA), uplink carrier frequency offset (CFO) or sampling time offset (STO), information for UL Multi-user (UL-MU) packets, UL RU-assignment information for multi-user acknowledgement, timing information for a triggering frame, or any other kind of control information.

According to some embodiments, the control information sent to the various devices (e.g., stations 204 or devices 420) may be targeted to particular devices. As such, individual devices 420 may monitor common control channel 406 and only decode control information intended for that particular user 420. For instance, according to some embodiments, user 1 is configured to only disclose control information from control channel 406 intended for user 1, user 2 only decodes information intended for user 2, etc. In order to facilitate this arrangement, information sent on control channel 406 can be organized as depicted in FIG. 5.

Figure 5:
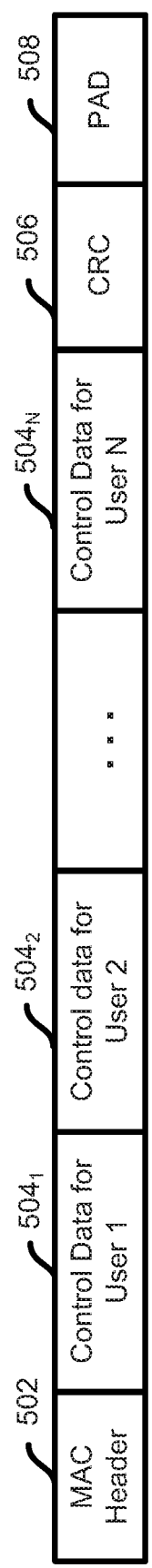
FIG. 5 is a diagram depicting a format for an example control channel message, according to some embodiments.

FIG. 5 depicts an example format 500 for a control channel message to multiple devices 420 via a common control channel 406, according to some embodiments. For ease of explanation, FIG. 5 will be discussed with respect to FIG. 4, but it should be understood that the format 500 depicted in FIG. 5 is not be limited to use with the specific embodiment disclosed in FIG. 4. As shown in FIG. 5, message 500 may include a header 502, such as a media access control header. The header 502 may be followed by control data for one or more of the devices. For instance, control data for user 1 $504_1$ may precede control data for user 2 $504_2$, and so on. Following the control data for user N $504_N$, the message 500 may include an error-detecting code 506 (e.g., a cyclic redundancy check (CRC) code), and/or a packet assembler/dissembler frame 508.

Figure 6:
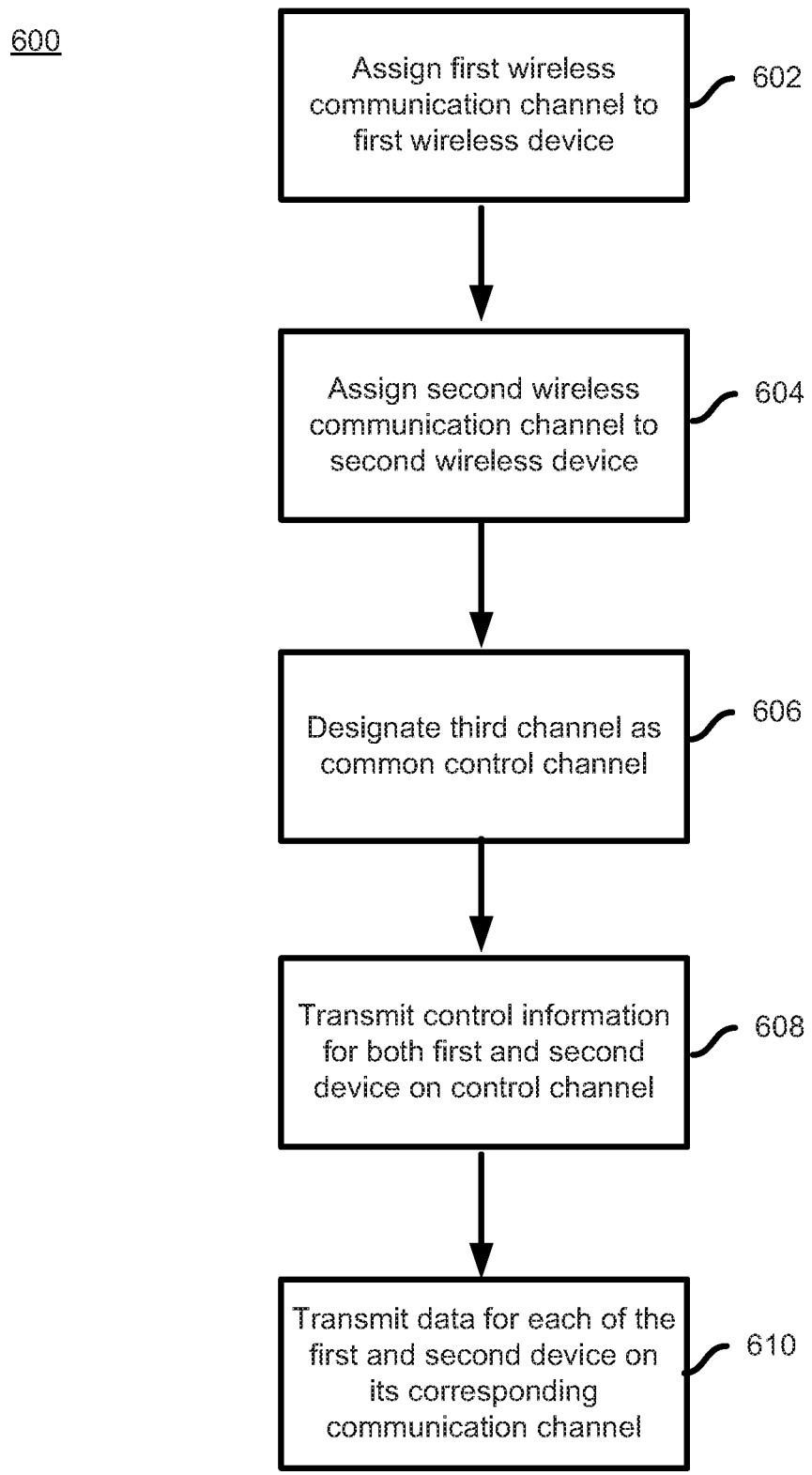
FIG. 6 is a flowchart depicting an example method of using a common control channel to communicate among wireless devices, according to some embodiments.

FIG. 6 is a flowchart depicting a method 600 of sending control information from an access point 202 to a plurality of wireless devices or stations 204 according to various embodiments. FIG. 6 will be explained with reference to the previous figures, but it should be understood that this is only for ease of explanation and should not be interpreted to limit the scope of method 600 to the specific embodiments depicted in those figures.

The method begins at 602 where a first wireless communication channel (e.g., channel 404) is assigned to a first wireless device (e.g., station $204_1$). At 604, the method 600 assigns a second wireless communication channel (e.g., channel 408) to a second wireless device (e.g., station $204_2$).

The method at 606 then designates a third channel (e.g., channel 406) as a common control channel to be shared by first and second wireless devices. The common control channel may include, for instance, a center channel or channels, such as channels 330A, 330B, and 330C, according to some embodiments. At 608, method 600 transmits control information for both the first and second devices on the control channel. According to some embodiments, the control information may contain specific information intended for the first device and separate control information intended for the second device. It is also possible for the transmitted control information to contain information intended for both the first and second wireless devices, according to some embodiments. The control information may include UL power control per electronic device or station (STA), uplink carrier frequency offset (CFO), or sampling time offset (STO), information for UL Multi-user (UL-MU) packets, UL RU-assignment information for multi-user acknowledgement, and/or timing information for a triggering frame, or any other kind of control information At 610, the method transmits data intended for each of the first and second wireless devices to the devices via the communication channels (communications channels 404 and 408) corresponding to each of the devices. According to embodiments 608 and 610 may be performed at least partially simultaneously or in reverse order.

Figure 7:
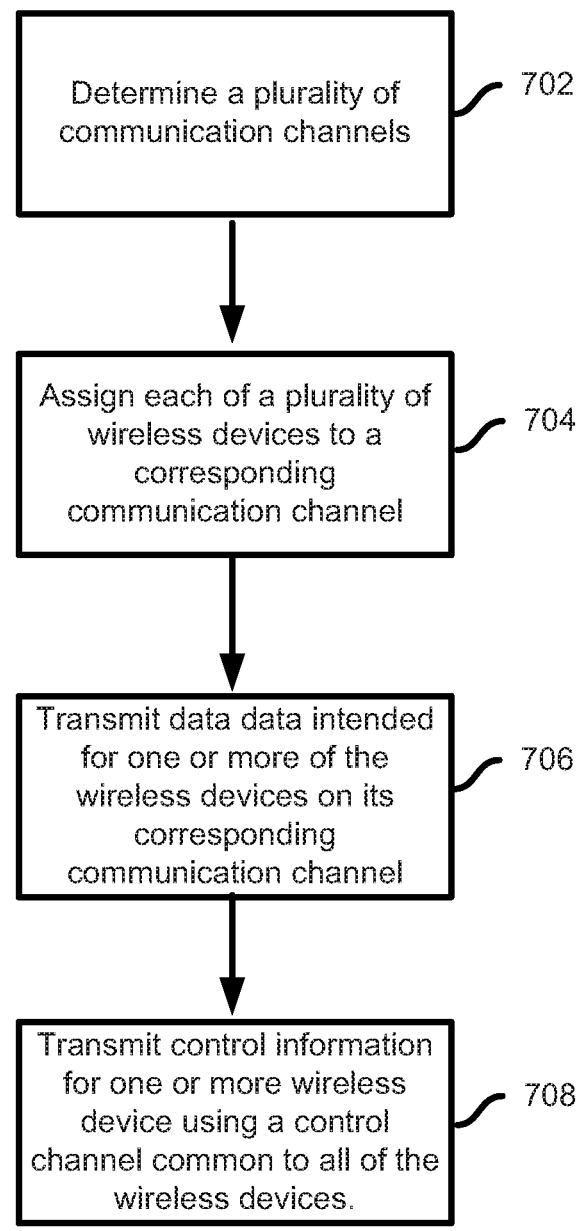
FIG. 7 is a flowchart depicting an example method of using a common control channel to communicate among wireless devices, according to some embodiments.

FIG. 7 is a flowchart depicting an example method 700 of communicating with a plurality of wireless devices using a common control channel, according to some embodiments. FIG. 7 will be explained with reference to the previous figures, but it should be understood that this is only for ease of explanation and should not be interpreted to limit the scope of method 700 to the specific embodiments depicted in those figures.

Method 700 begins with determining a plurality of communication channels. For instance, the method may determine to use one of the mappings depicted in FIGS. 3A-3C. At 704, method 700 assigns each of a plurality of wireless devices (e.g., stations 204) to a corresponding communication channel. Data intended for one or more of the wireless devices can then be transmitted to the one or more wireless devices via their corresponding communication channels (e.g., communication channels 404, 408, 410, and 412) at 706. At 708, method 700 transmits control information for one or more wireless devices using a control channel common to all of the wireless devices. For instance, according to some embodiments, the common control channel may include a center channel such as one of channels 330A, 330B, and 330C. Additionally, according to some embodiments, 706 and 708 may occur at least partially simultaneously or in reverse order.

Figure 8:
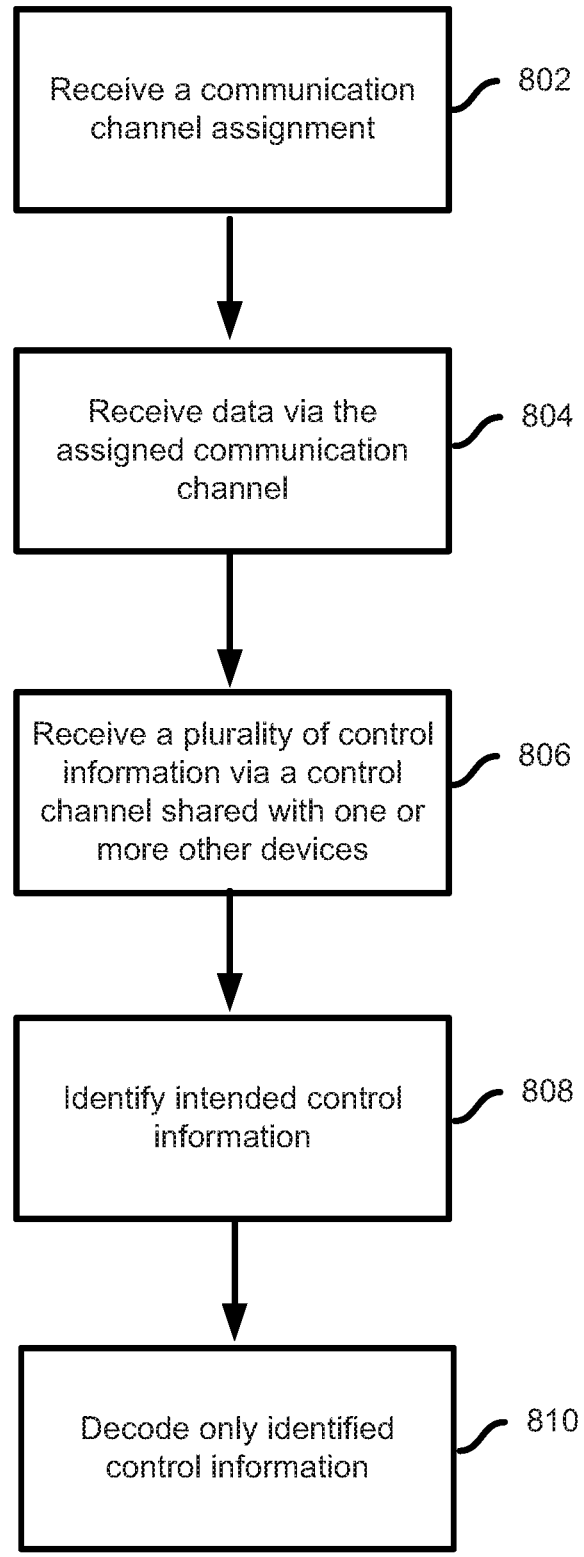
FIG. 8 is a flowchart depicting an example method of wireless device communication using a common control channel, according to some embodiments.

FIG. 8 is a flowchart depicting an example method 800 of communicating with an access point (e.g., access point 202) that uses a control channel common to several wireless devices (e.g., wireless devices 204), according to various embodiments. FIG. 8 will be explained with reference to the previous figures, but it should be understood that this is only for ease of explanation and should not be interpreted to limit the scope of method 900 to the specific embodiments depicted in those figures.

Method 800 begins by receiving a communication channel assignment from, for instance, access point 202 at 802. After receiving the communication channel assignment at 802, the method begins to receive data via the assigned communication channel at 804. At 806, the method receives control information aimed at a plurality of wireless devices over the common control channel (e.g., channel 406). The method can then identify relevant control information from the control information that is addressed to the plurality of wireless devices at 808. At 810, a device 420 can decode only the identified relevant information and then that decoded control information can be applied to the specific wireless device 420 implementing method 800.

FIG. 9 is a functional block diagram depicting an example electronic device 900 according to various embodiments. Electronic device 900 includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, programmable-logic devices, and/or one or more digital signal processors (DSPs).

Memory subsystem 912 may include one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program module 922 or operating system 924), which may be executed by processing subsystem 910. One or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this disclosure), to be executed by processing subsystem 910.

In addition, memory subsystem 912 can include mechanisms for controlling access to the memory. In some embodiments, memory subsystem 912 includes a memory hierarchy that includes one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (e.g., to perform network operations), including: control logic 916, an interface circuit 918, and a set of antennas 920 (or antenna elements) in an adaptive array that can be selectively turned on and/or off by control logic 916 to create a variety of optional antenna patterns or "beam patterns." (While FIG. 9 includes set of antennas 920, in some embodiments electronic device 900 can include one or more nodes, e.g., pads that can be coupled to set of antennas 920. Thus, electronic device 900 optionally not include set of antennas 920 in some embodiments. Networking subsystem 914 can include, for example, a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 914 includes processors, controllers, radios/antennas, sockets/plugs, and/or other devices used for coupling to, communicating on, and handling data and events for each supported networking system. Mechanisms used for coupling to, communicating on, and handling data and events on the network for each network system are sometimes collectively referred to as a "network interface" for the network system. Moreover, in some embodiments a "network" or a "connection" between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a smart watch, a consumer-electronic device, a portable computing device, an access point, a router, a switch, communication equipment, test equipment, and/or another electronic device.

Although specific components are used to describe electronic device 900, in some embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments, program module 922 is included in operating system 924, and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, some embodiments may include digital signals that have approximately discrete values and/or analog signals that have continuous values. Additionally, components and circuits may be single-ended or differential, and power supplies may be unipolar or bipolar.

In FIG. 9, the integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. The term "monitoring" as used herein includes receiving signals from other electronic devices and possibly performing one or more processing operations on the received signals, e.g., determining if the received signal includes a control channel, calculating an optional beam pattern, etc.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 922, operating system 924 (such as a driver for interface circuit 918) or in firmware in interface circuit 918. Alternatively or additionally, at least some of the operations in the communication technique may be implemented in a physical layer, such as hardware in interface circuit 918.

Figure 10:
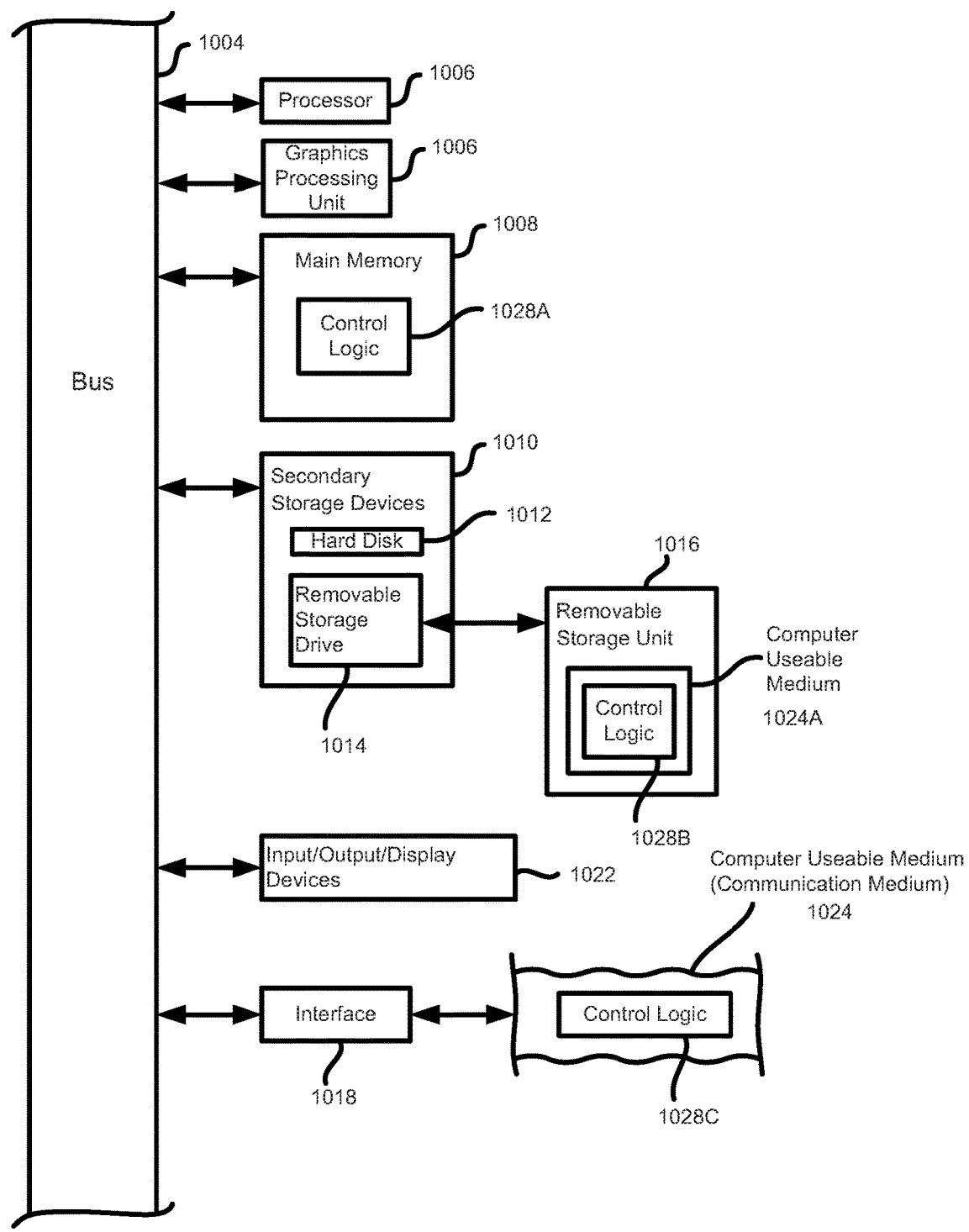
FIG. 10 is a functional block diagram depicting an example computer system that can be used to implement various aspects of the disclosed embodiments.

Various embodiments can be implemented, for example, using one or more well-known computer systems, such as computer system 1000 shown in FIG. 10. For instance, each of the components described with reference to FIGS. 2 and 9 could be implemented using a computer system such as computer system 1000. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In some embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In some embodiments, a tangible apparatus or article of manufacture including a tangible computer useable or readable medium having control logic (software) stored thereon is also referred to herein as a "computer program product" or "program storage device." This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method of wireless communication, comprising:
   assigning a first wireless communication channel to a first wireless device, wherein the first wireless communication channel includes a first subset of a plurality of tones;
   assigning a second wireless communication channel to a second wireless device, wherein the second wireless communication channel includes a second subset of the plurality of tones different than the first subset;
   designating a third wireless communication channel for use as a control channel common to the first wireless device and the second wireless device, wherein the third wireless communication channel includes a third subset of the plurality of tones different than the first and second subsets;
   transmitting data to the first wireless device via the first wireless communication channel; and
   transmitting first control information for the first wireless device and second control information for the second wireless device via the third wireless communication channel at least partially concurrently with the transmitting the data to the first wireless device,
   wherein at least one of the first or second control information comprises uplink (UL) resource unit (RU) assignment information for multi-user acknowledgement for the first wireless device or the second wireless device, a transmission power indication for at least one of the first wireless device or the second wireless device, and center frequency offset information for at least one of the first wireless device or the second wireless device, and
   wherein the first and second control information are transmitted using a control information message and wherein the control information message includes:
   a media access control header,
   first control data for the first wireless device, and
   second control data for the second wireless device.

2. The method of claim 1, wherein the plurality of tones belong to an orthogonal frequency-division multiple access (OFDMA) modulation scheme and the third subset of the plurality of tones is centered on a center frequency of the OFDMA modulation scheme.

3. The method of claim 1, wherein the first control information further comprises information configured to prepare the first wireless device to transmit an uplink data packet.

4. The method of claim 1, wherein the at least one of the first or second control information further comprises:
RU assignment information for at least one of the first wireless device or the second wireless device.

5. The method of claim 1, further comprising:
designating a fourth wireless communication channel for use as a second control channel, wherein the fourth wireless communication channel includes a fourth subset of the plurality of tones different than the first, second, and third subsets, and the fourth wireless communication channel is unassigned to any wireless device including the first and second wireless devices.

6. The method of claim 1, wherein:
the assigning the first wireless communication channel to the first wireless device comprises assigning, by an access point of a wireless local area network (WLAN), the first wireless communication channel to the first wireless device, and
the assigning the second wireless communication channel to the second wireless device comprises assigning, by the access point of the WLAN, the second wireless communication channel to the second wireless device.

7. The method of claim 1, wherein the first and second control information transmitted via the third wireless communication channel is coded with a lower modulation coding scheme (MSC) than that of the data transmitted via the first wireless communication channel.

8. A wireless access point, comprising:
a wireless interface configured to communicate using a plurality of wireless channels; and
one or more processors communicatively coupled to the wireless interface and configured to:
assign each of a plurality of wireless communication channels to a corresponding plurality of wireless devices, wherein each of the plurality of wireless communication channels includes a subset of a plurality of tones different than subsets associated with other ones of the plurality of wireless communication channels;
designate a common control channel for use by the plurality of wireless devices, wherein the common control channel includes one or more tones of the plurality of tones different than the subsets associated with the plurality of wireless communication channels;
transmit data to one of the plurality of wireless devices via its corresponding wireless communication channel; and
transmit control information intended for at least one of the plurality of wireless devices via the common control channel at least partially concurrently with the transmitting the data to the one of the plurality of wireless devices,
wherein the one or more tones of the plurality of tones designated for the common control channel is situated at a center of the plurality of tones, and
wherein the control information transmitted on the common control channel is coded with a lower modulation coding scheme (MSC) than that of the data transmitted on the plurality of wireless communication channels,
wherein the control information comprises uplink (UL) resource unit (RU) assignment information for multi-user acknowledgement for the plurality of wireless devices, and
wherein the control information is transmitted using a control information message and wherein the control information message includes:
a media access control header,
first control data for the least one of the plurality of wireless devices,
second control data for another one of the plurality of wireless devices, and
an error-detecting code.

9. The wireless access point of claim 8, wherein the plurality of tones belongs to an orthogonal frequency-division multiple access (OFDMA) modulation scheme.

10. The wireless access point of claim 8, wherein, to transmit the control information, the one or more processors are configured to transmit the control information further comprising information to prepare the one of the plurality of wireless devices to transmit an uplink data packet.

11. The wireless access point of claim 8, wherein the control information further comprises:
a transmission power indication;
multi-user multiple input multiple output (MIMO) center frequency offset information;
timing information for a triggering frame; and
RU assignment information.

12. The wireless access point of claim 8, wherein to transmit the control information, the one or more processors are configured to:
transmit a first item of information intended for the one of the plurality of wireless devices; and
transmit a second item of information intended for a second wireless device of the plurality of wireless devices.

13. The wireless access point of claim 8, wherein the common control channel is unassigned to the plurality of wireless devices.

14. The wireless access point of claim 8, wherein the wireless access point operates in a wireless local area network (WLAN).

15. The wireless access point of claim 8, wherein the one or more tones of the plurality of tones designated for the common control channel comprise 26 tones centered on a direct current tone of the plurality of tones.

16. A wireless device, comprising:
a wireless interface configured to communicate using a plurality of wireless communication channels; and
one or more processors communicatively coupled to the wireless interface and configured to:
receive data packets from a wireless access point via a first channel of the plurality of wireless communication channels, wherein the first channel includes one or more tones of a plurality of tones and is assigned for exclusive use by the wireless device; and
receive control information, at least partially concurrently with the receiving the data packets, from the wireless access point via a separate control channel, wherein the separate control channel is common to at least one additional wireless device and includes one or more tones of the plurality of tones different than the one or more tones of the first channel; and
determine, using the received control information, uplink (UL) resource unit (RU) assignment information for multi-user acknowledgement for the wireless device, a transmission power indication for the wireless device, center frequency offset information for the wireless device, and RU assignment information for the wireless device, wherein the control information is received using a control information message and wherein the control information message includes:

a media access control header, first control data for the wireless device, and second control data for another wireless device.

17. The wireless device of claim 16, wherein:

the plurality of tones belongs to an orthogonal frequency-division multiple access (OFDMA) modulation scheme, and the one or more tones associated with the separate control channel are centered on a center frequency of the OFDMA modulation scheme.

18. The wireless device of claim 16, wherein the one or more processors are configured to receive the control information further comprising information configured to prepare the wireless device to transmit uplink packets.

19. The wireless device of claim 16, wherein the one or more processors are further configured to:

identify an item of information received on the separate control channel that is relevant to the wireless device; and decode the identified item of information.

\* \* \* \* \*